United States Patent

Stefanello et al.

[11] Patent Number: 5,840,119
[45] Date of Patent: Nov. 24, 1998

[54] FLUORIDE ENRICHED SUGARLESS GUM SYSTEM

[76] Inventors: Michael Louis Stefanello; Richard Timothy Stefanello, both of 26 Second Ave., East Rockaway, N.Y. 11518

[21] Appl. No.: 617,636

[22] Filed: Mar. 19, 1996

[51] Int. Cl.6 .................................................. A23G 3/20
[52] U.S. Cl. .............................. 118/13; 118/308; 426/3; 426/5; 426/281; 426/289; 99/494; 99/516; 99/532; 424/48; 424/52; 424/439
[58] Field of Search .................... 118/13, 308; 426/3, 426/5, 281, 289; 99/494, 516, 532; 424/48, 52, 439

[56] References Cited

U.S. PATENT DOCUMENTS

| | | | |
|---|---|---|---|
| 810,210 | 1/1906 | Laws . | |
| 2,197,219 | 4/1940 | Groshong | 426/5 |
| 2,699,717 | 1/1955 | Moreland et al. | 99/532 |
| 3,590,721 | 7/1971 | Hoffmann | 426/281 |
| 4,252,829 | 2/1981 | Terrevazzi | 426/3 |
| 4,254,151 | 3/1981 | Townsend | 426/281 |
| 4,301,178 | 11/1981 | Witzel et al. | 426/5 |
| 4,301,763 | 11/1981 | Goldstone et al. | 118/308 |
| 4,316,915 | 2/1982 | Friello et al. | 426/5 |
| 4,382,963 | 5/1983 | Klose et al. | 426/3 |
| 4,419,346 | 12/1983 | Stroz et al. | 426/3 |
| 4,466,983 | 8/1984 | Cifrese et al. | 426/5 |
| 4,513,012 | 4/1985 | Carroll et al. | 426/5 |
| 4,563,345 | 1/1986 | Arrick | 426/3 |
| 4,612,195 | 9/1986 | Puglia et al. | 426/289 |
| 4,822,597 | 4/1989 | Faust et al. | 426/5 |
| 4,831,923 | 5/1989 | Ek | 99/494 |
| 4,903,590 | 2/1990 | Muller et al. | 426/281 |
| 4,980,178 | 12/1990 | Cherukuri et al. | 426/5 |
| 5,078,090 | 1/1992 | Richman | 118/308 |
| 5,336,509 | 8/1994 | McGrew et al. | 426/3 |
| 5,342,235 | 8/1994 | Watanabe | 99/532 |
| 5,498,429 | 3/1996 | Orlandi et al. | 426/5 |
| 5,545,415 | 8/1996 | Tyrpin et al. | 426/3 |
| 5,585,110 | 12/1996 | Kalili et al. | 424/48 |
| 5,618,517 | 4/1997 | Miskewitz | 424/48 |
| 5,626,892 | 5/1997 | Kehoe et al. | 426/3 |

*Primary Examiner*—Peter Chin
*Assistant Examiner*—Michael P. Colaianni

[57] ABSTRACT

A fluoride enriched sugarless gum system comprises a plurality of sugarless chewing gum sticks each containing a gum base of between about 10% and 80% by weight, each gum stick also including a softening agent, a sweetening agent and a bulking agent, each gum stick including fluoride material applied thereto.

1 Claim, 3 Drawing Sheets

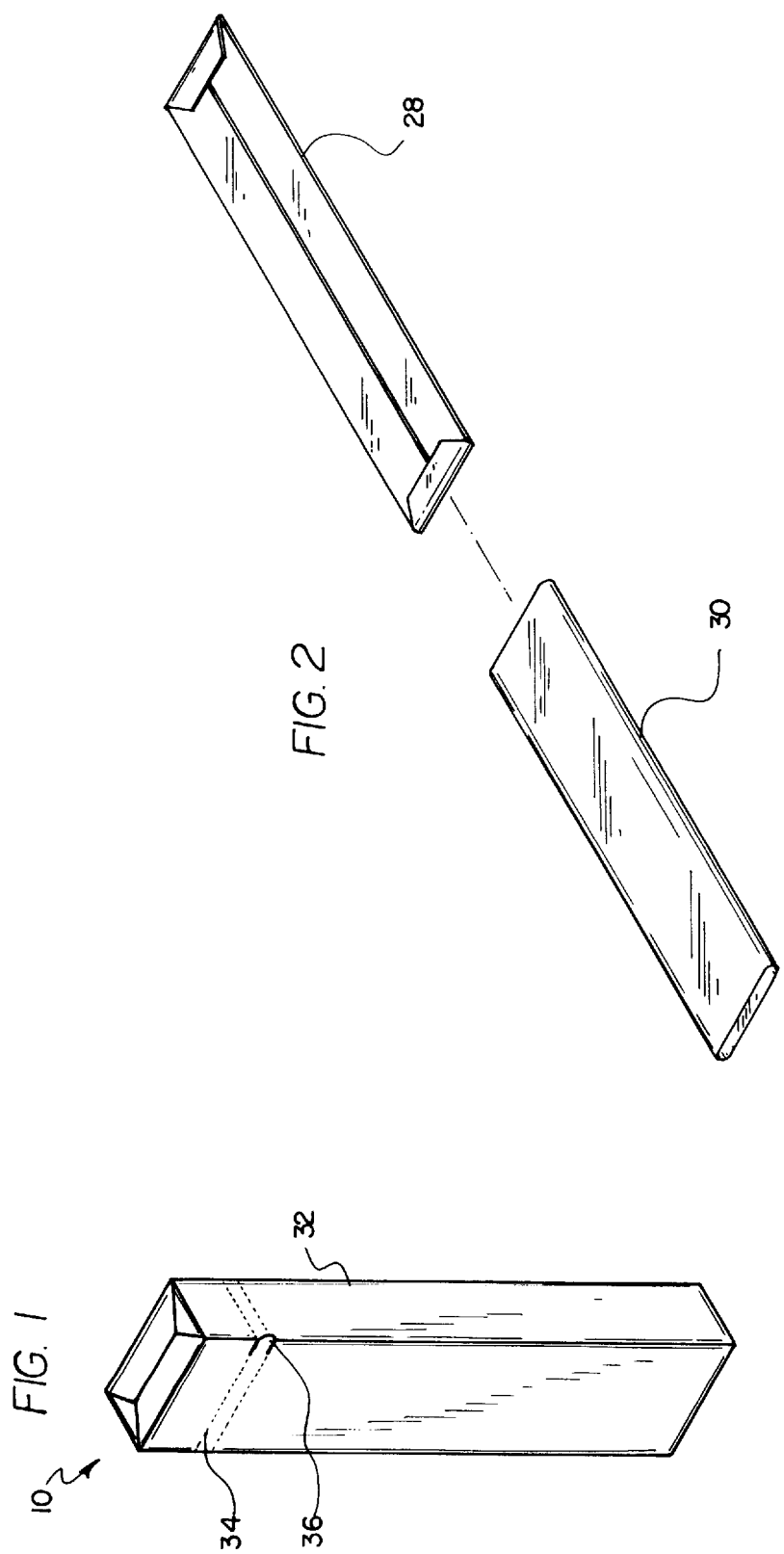

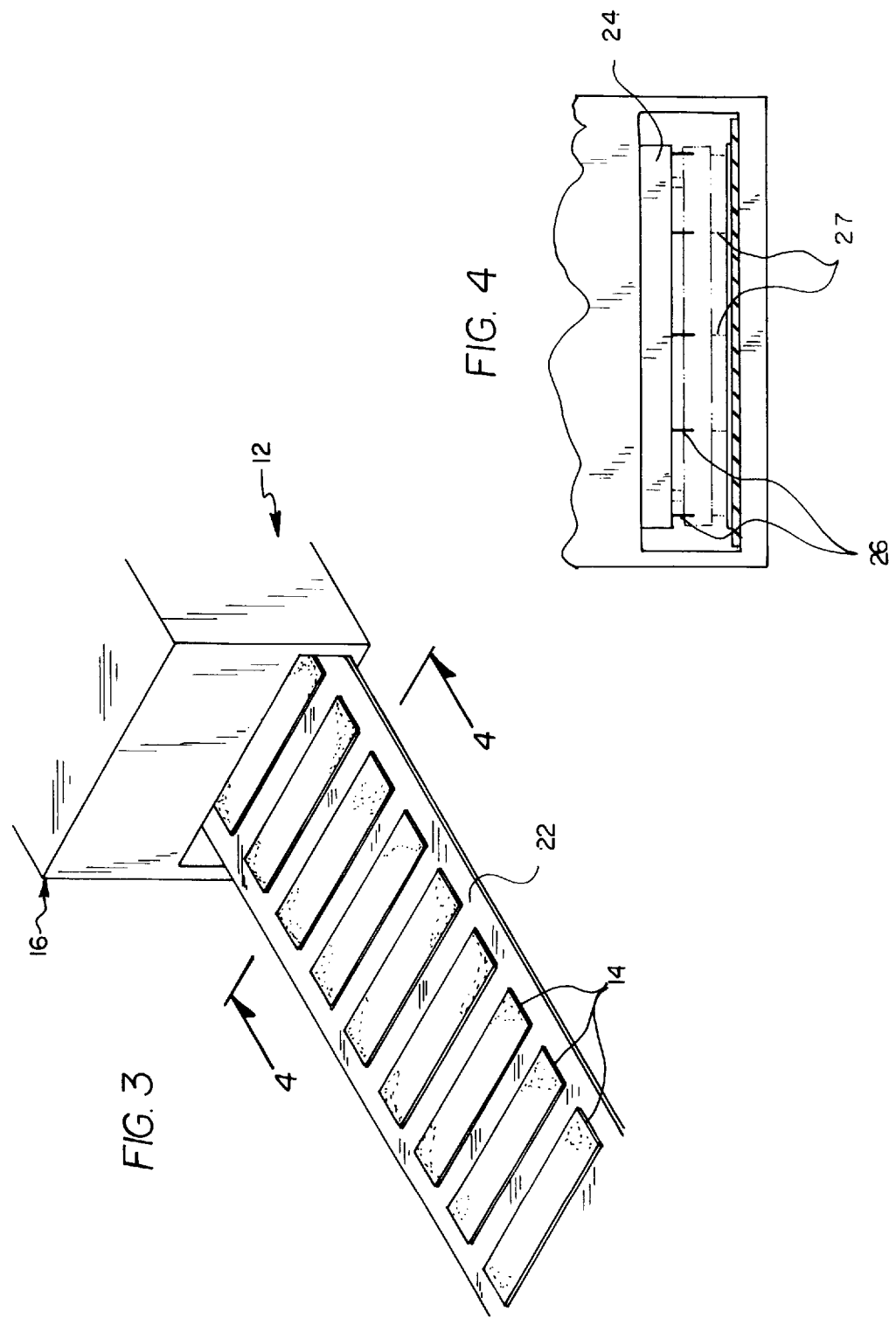

FLUORIDE ENRICHED SUGARLESS GUM SYSTEM

BACKGROUND OF THE INVENTION

1. Field of the Invention

The present invention relates to a fluoride enriched sugarless gum system and more particularly pertains to incorporating fluoride within sugarless chewing gum.

2. Description of the Prior Art

The use of chewing gum is known in the prior art. More specifically, chewing gum heretofore devised and utilized for the purpose of integrating various flavors and ingredients are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,983,405 to Cherukurie et al. discloses a reduced and low-calorie sugar and sugarless chewing gum compositions containing fiber.

U.S. Pat. No. 4,808,401 to Gaffer et al. discloses anticalculus oral composition.

U.S. Pat. No. Des. 271,344 to Faust discloses two color chewing gum.

U.S. Pat. No. 5,075,118 to DiFalco, Jr. et al. discloses a method for making sugarless xylitol containing chewing gum.

U.S. Pat. No. 4,522,805 to Gordon discloses tooth and gum dentifrice.

U.S. Pat. No. 4,961,935 to Cherukuri et al. discloses a sugarless, substantially anhydrous chewing gum compositions and methods for preparing same.

U.S. Pat. No. 4,786,511 to Huzinec et al. discloses coatings for chewing gums containing gum arabic and a soluable calcium salt.

While these devices fulfill their respective, particular objective and requirements, the aforementioned patents do not describe a fluoride enriched sugarless gum system for incorporating fluoride within sugarless chewing gum.

In this respect, the fluoride enriched sugarless gum system according to the present invention substantially departs from the conventional concepts and designs of the prior art, and in doing so provides an apparatus primarily developed for the purpose of incorporating fluoride within sugarless chewing gum.

Therefore, it can be appreciated that there exists a continuing need for new and improved fluoride enriched sugarless gum system which can be used for incorporating fluoride within sugarless chewing gum. In this regard, the present invention substantially fulfills this need.

SUMMARY OF THE INVENTION

In the view of the foregoing disadvantages inherent in the known types of chewing gum now present in the prior art, the present invention provides an improved fluoride enriched sugarless gum system. As such, the general purpose of the present invention, which will be described subsequently in greater detail, is to provide a new and improved fluoride enriched sugarless gum system and method which has all the advantages of the prior art and none of the disadvantages.

To attain this, the present invention essentially comprises a new and improved fluoride enriched sugarless gum system comprising, in combination: a fluoride applicator machine including an essentially hollow main housing with a front wall including a rectangular slot, a conveyor belt with an upper surface being positioned horizontally through the slot and main housing, the main housing having means to rotate the conveyor belt, an upper plate with an essentially hollow interior being operatively coupled within the main housing above the conveyor belt, the upper plate including a plurality of downwardly extending injectors, the upper plate including liquid fluoride in an operative orientation; a plurality of sugarless chewing gum sticks each formed in a planar generally rectangular configuration, each gum stick containing a gum base of between about 10% and 80% by weight, each gum stick further including a softening agent, a sweetening agent and a bulking agent, in an operative orientation the gum sticks being positioned on the upper surface of the conveyor belt and moved through the slot and within the fluoride applicator machine, the upper plate then moving downward thereby causing the injectors to penetrate the sticks of gum and force liquid fluoride within the gum sticks; and a plurality of foil wrappers, each wrapper sized and shaped to be wrapped around an individual stick of gum, a plurality of sleeves each formed in a generally rectangular configuration with a hollow interior, each sleeve adapted to receive and retain a foil wrapped stick of gum, a plurality of outer casings each formed in a generally rectangular configuration with a hollow interior, six sticks of gum being positioned within the hollow interior of each outer casing in a stored orientation, each outer casing having an upper region including a tear away strip.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fluoride enriched sugarless gum system which has all the advantages of the prior art chewing gum and none of the disadvantages.

It is another object of the present invention to provide a new and improved fluoride enriched sugarless gum system which may be easily and efficiently manufactured and marketed.

It is a further object of the present invention to provide a new and improved fluoride enriched sugarless gum system which is of durable and reliable construction.

An even further object of the present invention is to provide a new and improved fluoride enriched sugarless gum system which is susceptible of a low cost of manufacture with regard to both materials and labor, and which accordingly is then susceptible of low prices of sale to the consuming public, thereby making such a fluoride enriched sugarless gum system economically available to the buying public.

Still yet another object of the present invention is to provide a new and improved fluoride enriched sugarless gum system which provides in the apparatuses and methods of the prior art some of the advantages thereof, while simultaneously overcoming some of the disadvantages normally associated therewith.

Even still another object of the present invention is to provide a new and improved fluoride enriched sugarless gum system for incorporating fluoride within sugarless chewing gum.

Lastly, it is an object of the present invention to provide a new and improved fluoride enriched sugarless gum system comprising: a plurality of sugarless chewing gum sticks each containing a gum base of between about 10% and 80% by weight, each gum stick also including a softening agent, a sweetening agent and a bulking agent, each gum stick including fluoride material applied thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the fluoride enriched sugarless gum system constructed in accordance with the principles of the present invention.

FIG. 2 is a separated perspective illustration of the sleeve and foil wrapper of the apparatus.

FIG. 3 is a perspective illustration of the fluoride applicator machine of the apparatus.

FIG. 4 is a cross sectional view taken along section line 4—4 of FIG. 3 illustrating the injectors and conveyor belt of the apparatus.

The same reference numerals refer to the same parts through the various Figures.

DESCRIPTION OF THE PREFERRED EMBODIMENT

Figure 5:
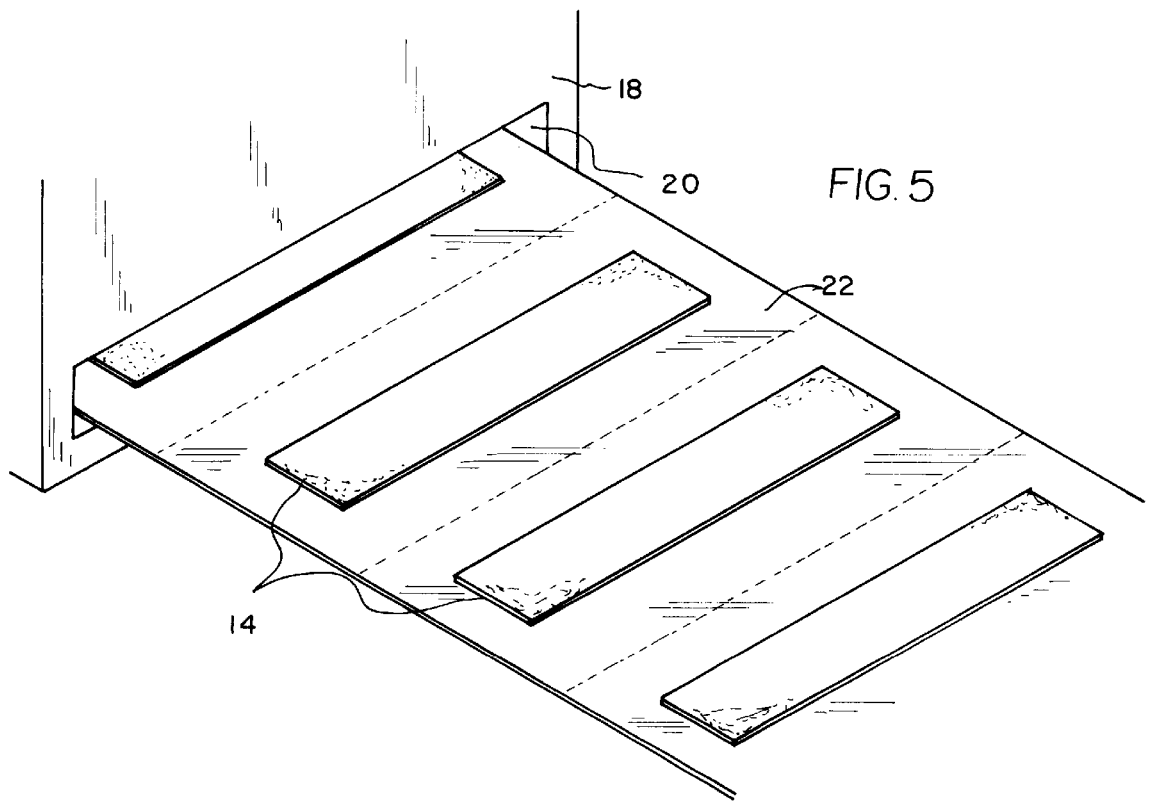
FIG. 5 is a perspective view of the front slot of the fluoride applicator, conveyor belt and a plurality of sticks of gum.

With reference now to the drawings, and in particular, to FIG. 1 thereof, the preferred embodiment of the new and improved fluoride enriched sugarless gum system embodying the principles and concepts of the present invention and generally designated by the reference number 10 will be described.

Specifically, it will be noted in the various Figures that the device relates to a fluoride enriched sugarless gum system. In its broadest context, the device consists of a fluoride applicator machine 12 and a plurality of sugarless chewing gum sticks 14. Such components are individually configured and correlated with respect to each other so as to attain the desired objective.

The fluoride applicator machine 12 includes an essentially hollow main housing 16 with a front wall 18 including a rectangular slot 20. A conveyor belt 22 with an upper surface is positioned horizontally through the slot and main housing. The main housing has means to rotate the conveyor belt through the slot in the front wall. Note FIG. 3.

The main housing has an upper plate 24 with an essentially hollow interior. The upper plate is operatively coupled within the main housing above the conveyor belt. The upper plate oscillates upward and downward during operation of the apparatus. The upper plate includes a plurality of downwardly extending injectors 26. The injectors are each formed in a generally cylindrical configuration with an axial aperture extending through them. The upper plate includes liquid fluoride 27 in an operative orientation. The liquid fluoride passes through the injectors when the upper plate is moved downward to engage the gum on the conveyor belt. Note FIGS. 3 and 4.

The plurality of sugarless chewing gum sticks 14 are each formed in a planar generally rectangular configuration. Each gum stick contains a gum base of between about 10% and 80% by weight. Each gum stick further includes a softening agent, a sweetening agent and a bulking agent. The gum base is selected from the group consisting of synthetic gums, natural gums, natural elastomers and combinations of the above. The softening agent is Glycerin in the preferred embodiment. The sweetening agent is selected from the group of natural flavors, artificial flavors and mixtures of the above. The bulking agent provides the gum with a firm texture and reduced moisture absorption. Note FIGS. 3 and 4.

In an operative orientation the gum sticks are positioned on the upper surface of the conveyor belt and moved along with the conveyor belt through the slot and within the fluoride applicator machine. The upper plate then moves downward thereby causing the injectors to penetrate the sticks of gum and force liquid fluoride within the gum sticks. The gum sticks now include a quantity of fluoride. As discussed below, in a second embodiment of the apparatus 40 the fluoride is applied to the outer surface of the gum sticks in a powdered form. After this stage has been completed the gum sticks are ready for packaging. Note FIGS. 4 and 5.

A plurality of foil wrappers 28 are each sized and shaped to be wrapped around an individual stick of gum. A plurality of sleeves 30 are each formed in a generally rectangular configuration with a hollow interior. Each sleeve is adapted to receive and retain a single foil wrapped stick of gum. A plurality of outer casings 32 are each formed in a generally rectangular configuration with a hollow interior. Six sticks of gum are positioned within the hollow interior of each outer casing in a stored orientation. The outer casing has an upper region which including a tear away strip 34 with a pull tab 36 to facilitate opening of the outer casing. Note FIGS. 1 and 2.

Figure 6:
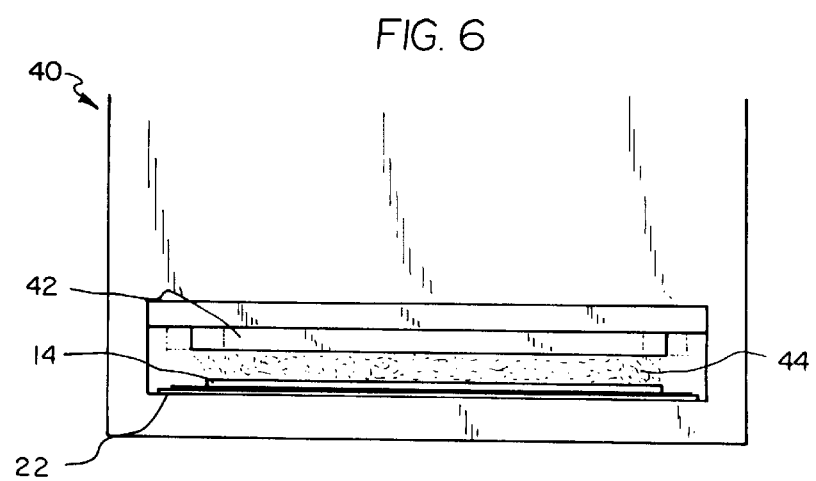
FIG. 6 is a front elevational view of an alternate embodiment of the fluoride applicator illustrating the range of motion of the upper plate.

A second embodiment of the present invention 40 is shown in FIG. 6. The second embodiment includes substantially all of the components of the present invention except that the upper plate 42 of the fluoride applicator machine has a plurality of apertures and includes powdered fluoride contained within it in an operative orientation. The upper plate moves from side to side as the conveyer belt passes through the outer housing, This action causes powdered fluoride 44 to be dispersed upon and affixed to the sticks of gum. Note FIG. 6.

The present invention provides a convenient method of applying fluoride to an individual's teeth. It solves the problem of having to brush after a meal at a restaurant, ball game, on the job, eating while traveling, etc. Chewing sugarless gum always cleans food particles from one's teeth. However, the present invention goes one step further by incorporating fluoride to strengthen teeth and cut down on cavities.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A fluoride enriched sugarless gum apparatus comprising, in combination:

liquid fluoride;

a fluoride applicator machine including an essentially hollow main housing with a rectangular slot, a conveyor belt being positioned through the slot and main housing, the main housing having means to rotate the conveyor belt, an upper plate being operatively coupled within the main housing above the conveyor belt for oscillating up and down during operation, the upper plate having a liquid fluoride reservoir therein the liquid fluoride therein and a plurality of downwardly extending injectors in fluid communication with said reservoir for engaging gum on the conveyor belt and allow the liquid fluoride to pass through and into the gum;

means for forming a plurality of sugarless chewing gum sticks having a planar generally rectangular configuration, each gum stick containing a gum base of between about 10% and 80% by weight and selected from the group consisting of synthetic gums, natural gums, and natural elastomers, each gum stick further including glycerin as a softening agent, a mixture of natural flavors and artificial flavors as sweetening agent and a bulking agent, means for positioning in an operative orientation the gum sticks on an upper surface of said conveyor belt for movement through the slot and within the fluoride applicator machine, means for moving said upper plate downward thereby causing the injectors to penetrate the sticks of gum and force liquid fluoride within the gum sticks; and means for wrapping a plurality of foil wrappers, each wrapper sized and shaped to be wrapped around an individual stick of gum thereby forming foil wrapped gum sticks, means for forming a plurality of sleeves each of said sleeves formed in a generally rectangular configuration with a hollow interior, means for positioning said foil wrapped gum sticks in said sleeves, means for forming a plurality of outer casings each formed in a generally rectangular configuration with a hollow interior, means for positioning six sticks of gum within the hollow interior of each outer casing in a stored orientation, each outer casing having an upper region including a tear away strip with a pull tab to facilitate opening of the outer casing.

* * * * *